April 19, 1960 H. H. WHEELER ET AL 2,933,003
CONTINUOUS WEB FEEDING MEANS WITH SPACED
DIE ENGAGING CUT-OUT PORTION
Filed July 23, 1956 9 Sheets-Sheet 1

FIG. 1

INVENTOR
HENRY H. WHEELER
NEAL R. PARLATORE
BY
ATTORNEY

FIG.2

INVENTOR
HENRY H. WHEELER
NEAL R. PARLATORE
BY Bradley Cohn
ATTORNEY

INVENTOR
HENRY H. WHEELER
NEAL R. PARLATORE
BY
ATTORNEY

INVENTOR
HENRY H. WHEELER
NEAL R. PARLATORE
BY Bradley Cohn
ATTORNEY

United States Patent Office 2,933,003
Patented Apr. 19, 1960

2,933,003
CONTINUOUS WEB FEEDING MEANS WITH SPACED DIE ENGAGING CUT-OUT PORTION

Henry H. Wheeler, Bellerose, and Neal R. Parlatore, Laurelton, N.Y., assignors to International Cigar Machinery Company, a corporation of New Jersey Application July 23, 1956, Serial No. 599,586

10 Claims. (Cl. 83—422)

This invention relates to cigar machines, more particularly to automatic binder and wrapper material feeds for high speed cigar machines.

It is an object of this invention to use the model wrapper or cutting die of a cigar machine.

It is a further object of the invention to continuously feed a continuous web of binder or wrapper material across a die cutting section of a high speed cigar machine to the end that it may be cut in a suitable or desired model shape.

Several methods have been advanced for economically feeding continuous web materials of this type to a cigar machine. In certain of these methods a wrapper or binder is cut by shaped knives acting upon an advanced leading portion of the web. Binder or wrapper material has also been drawn across the die by take-up rollers winding the unsevered portion of the web. However, in order to employ a web of minimum width and to accomplish further economies in the use of material, it is an object of the invention to advance the web upon a supporting belt to suctionally hold the web to the belt before and during the cutting operation, then to remove minimum waste from the working area.

It is accordingly an object of this invention to provide an indexed belt across a portion of the wrapper or binder cutting die turret of a cigar machine, to perform the die cutting operation while the web is on the belt and then to lift the severed portion from the belt.

A further object of the invention is to devise an endless steel belt to support and grip the web and advance it to the die cutter.

Another object is to provide a controlled feed of web from a reel and to automatically provide for termination or breakage in the web from the reel.

It is also an object of the invention to suctionally retain a web on said belt by applying suction along the marginal edges of the web.

The novel features which we believe to be characteristic of the invention are set forth with particularity in the appended claims. The invention itself, however, both as to its organization and method of operation may be understood by reference to the apparatus embodying the invention and shown in the accompanying drawings in which:

Figure 1:
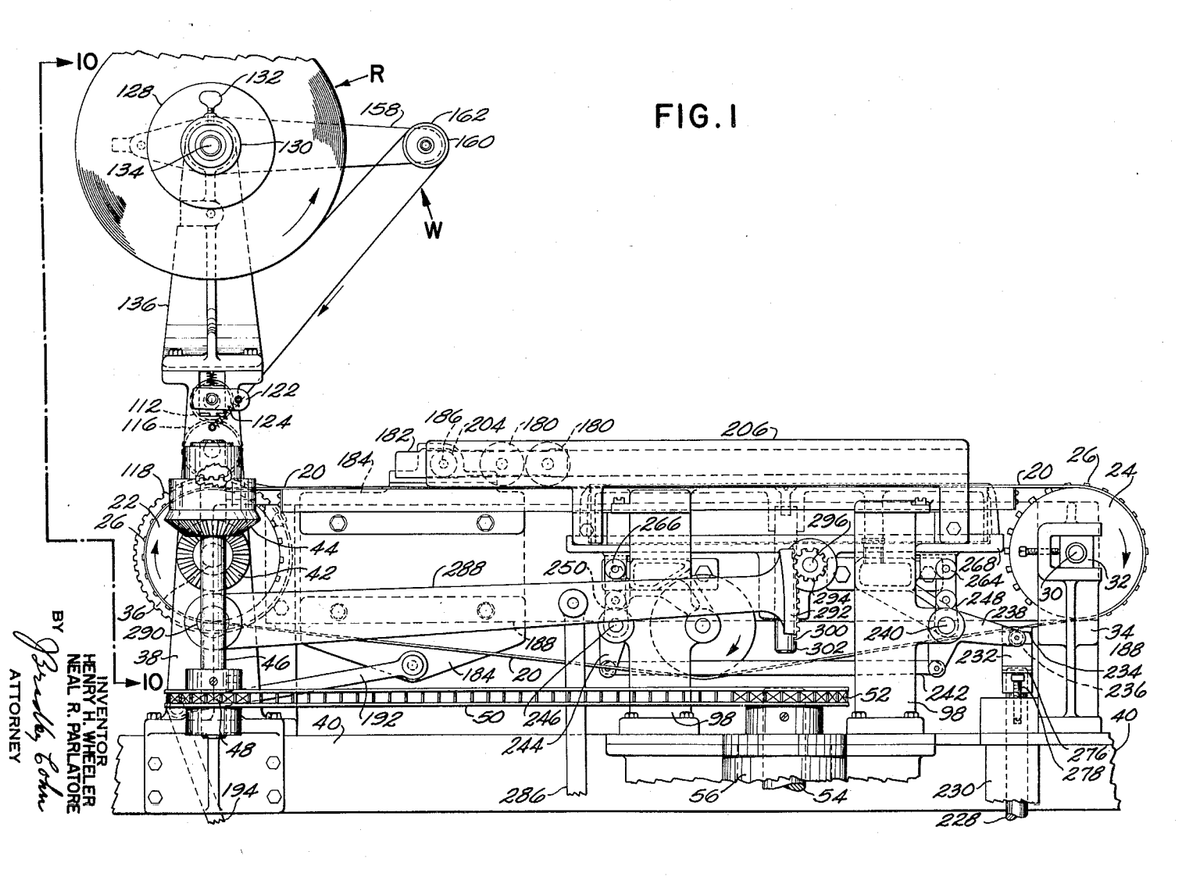
Fig. 1 is a side elevation of the upper portion of the web feed.
Figure 2:
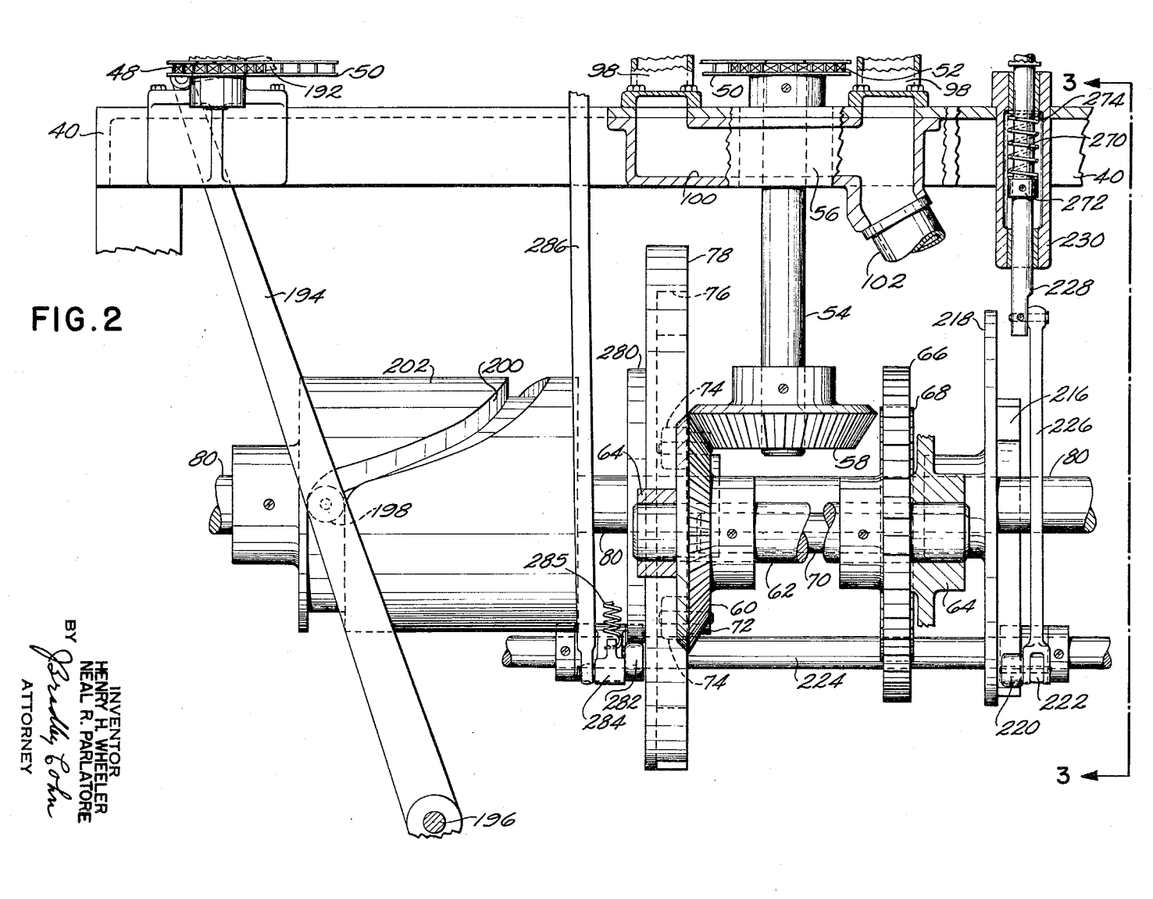
Fig. 2 is a side elevation of the lower portion of the web feed illustrating the driving and indexing mechanism for the same.
Figure 3:
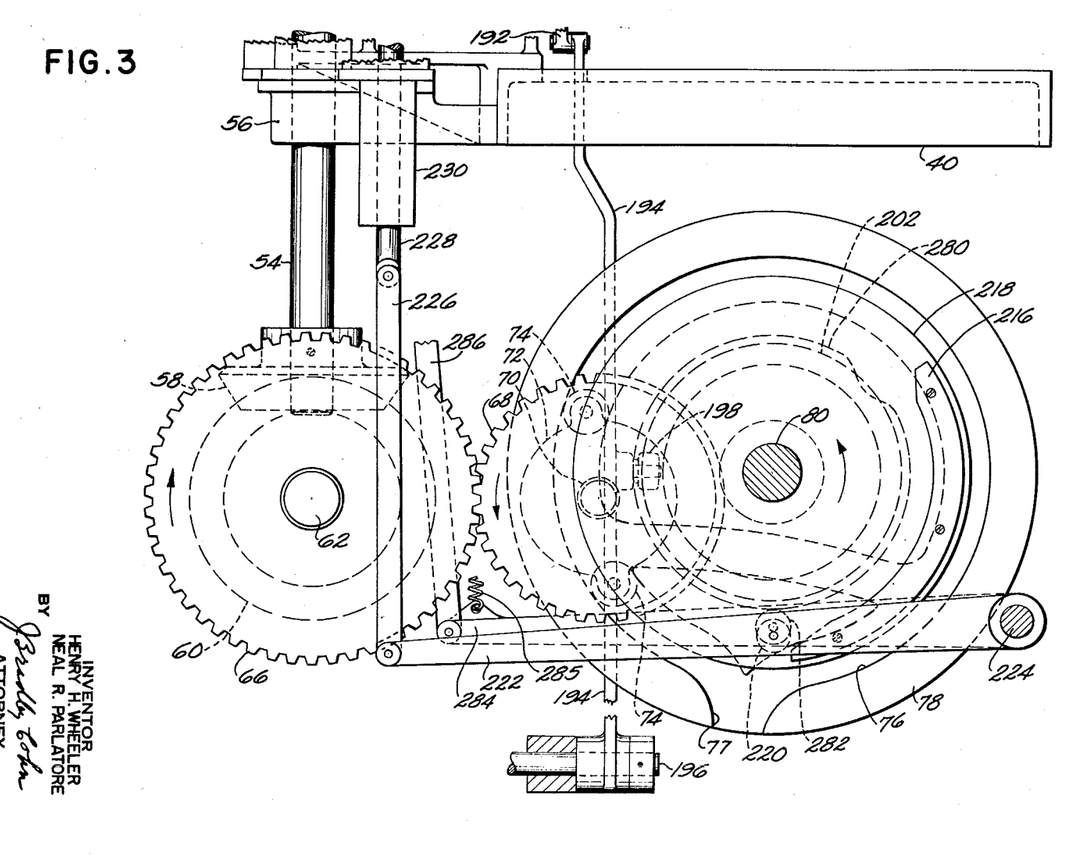
Fig. 3 is an end elevation of the driving and indexing mechanism taken on line 3—3 of Fig. 2.

The web feed consists of an endless steel belt 20 stretched over a pair of spaced drums 22 and 24, each of which is provided with a circumferential row of sprocket teeth 26 to engage suitable notches 28 in belt 20. The drum 24 is merely an idler drum mounted on a shaft 30 loosely supported in a bearing block 32 adjustably supported in a suitable bracket 34. Drum 22 is a driving drum and is mounted on an intermittently rotated shaft 36 held by suitable bearings in a bracket 38 secured to the bed plate 40 of the machine. Shaft 38 is intermittently rotated by means of a bevel gear 42 meshing with a bevel gear 44 mounted on a vertical shaft 46 supported by suitable bearing lugs of bracket 38. Shaft 46 carries a sprocket 48 driven through a chain 50 by a sprocket 52 mounted on a vertical shaft 54 supported in a suitable bearing of a bracket 56. To the lower end of shaft 54 (Figs. 2 and 3) is secured a bevel gear 58 meshing with a bevel gear 60 on horizontal shaft 62 supported by suitable bearing lugs 64 to the main frame of the machine. Shaft 62 also has a gear 66 meshing with a gear 68 which is secured to a shaft 70 also supported by suitable bearings of the main frame of the machine (not shown). To shaft 70 is secured an indexing disc 72 which carries two rollers 74 spaced 180 degrees apart. Rollers 74 alternately engage with a suitably shaped portion 77 of track 76 of an indexing cam 78 mounted on the main cam shaft 80 of the machine. The latter is connected to and continuously driven from the main drive of the machine. From the arrangement shown and described it is evident that the continuous rotation of shaft 80 is transformed from continuous rotary motion to intermittent rotary motion on shaft 62 through means of the indexing cam 78 and indexing disc 72 and gear 66. Figs. 14 to 20 show progressive positions of the indexing cam 78 and the indexing disc 72 whereby continuous rotary motion is translated into intermittent rotary motion.

While this mechanism may be equally well used with either a wrapper or a binder die, the drawings illustrate the invention as applied to a wrapper die.

The intermittently driven steel belt 20 in its central portion is provided with a plurality of suitably shaped and properly spaced cut-outs 82 which are of the same shape but slightly larger than the cutting die 84 illustrated in the drawings. The endless steel belt 20 is indexed to advance successive cut-outs 82 to register over the die 84 during the intermittent dwell.

Evenly spaced holes 86, 88 are formed near each edge of belt 20 to permit suction to hold the edges of the web W to said steel belt 20. Holes 86 and 88 pass over suitable slots 90 and 92, respectively, of suction channels 94 and 96 mounted on a suitable suction duct member 98 secured to a suction chamber 100 communicating with a suitable tube 102 connected to a continuous source of suction (not shown).

The tobacco web material is intermittently fed from a reel R by means of a pair of feed rollers 104 and 106. Roller 106 is mounted on a horizontal shaft 108 supported in suitable bearings in the bracket 38. The feed roller 104 is loosely supported by a shaft 110 and is provided with a gear 112 meshing with a gear 114 secured to shaft 108. Shaft 108 is driven by its gear 116 in mesh with a gear 118 mounted on the shaft 36 intermittently rotated as above described.

The shaft 110, loosely supporting the feed roller 104, is mounted in bracket 38 by a pair of eccentric ends 120 by means of which the roller 104 may be engaged or disengaged from the feed roller 106. A lug 122, secured to shaft 104, is provided with a tension spring 124 employed to provide the necessary feeding tension on the web passing between rollers 104 and 106.

The reel R is clamped between two flanges 126 and 128, the former of which is integral with a sleeve member 130 while flange 128 by means of a set screw 132 is removably attached thereto. Sleeve member 130 is supported by a horizontal stud shaft 134 held by a bracket arm 136 secured to bracket 38. The lateral position is checked by means of a disc 138 engaging an annular groove 140 of a hub 142 of said sleeve member. The disc 138 is loosely attached to a horizontal spindle 144 engaging a threaded boss 146 of the bracket arm 136. The horizontal spindle 144 is provided with a knob 148 which when turned will effect a lateral adjustment of the sleeve member 130 and consequently of the reel R supported thereon.

Figure 11:
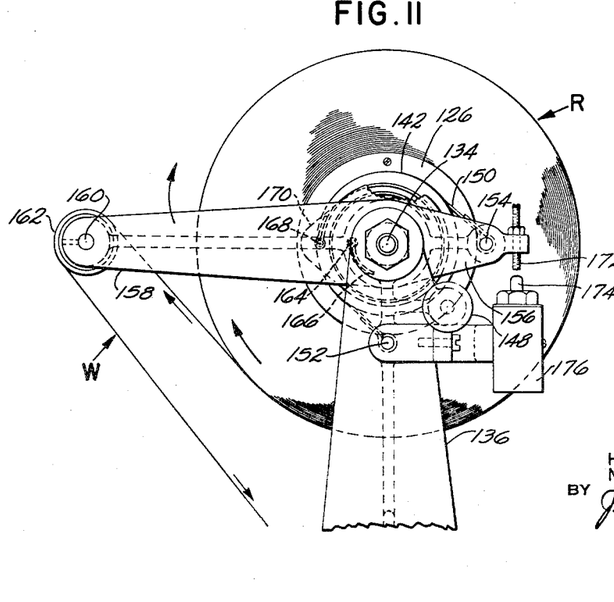
Fig. 11 is a partial side elevation of the web feed control mechanism taken on line 11—11 of Fig. 10.

The hub 142 of sleeve member 130 engages with a brake band 150 anchored at its one end to a stud 152 on the bracket arm 136 and connected at its other end to a stud 154 on the lug 156 of an arm 158 pivotally secured to the horizontal stud shaft 134. Arm 158 at its free end carries another stud shaft 160 (Fig. 11) rotatably supporting an idler roller 162 over which the web W is trained from the reel R to the feed rollers 104, 106. Arm 158 by means of another stud 164 is attached at one end to the torque spring 166 whose other end is anchored to a stud 168 on a lug 170 projecting from the hub portion 142 of the sleeve member 130. The lug 156 of arm 158 also carries an adjustable trip screw 172 which when arm 158 rotates clockwise as shown in Fig. 11 will depress the switch button 174 of a micro switch 176. This structure has two functions. In the first instance in the event of overrunning of the reel R during the intermittently feeding motion the arm 158 and its integral lug 156 will rotate clockwise a small distance until the brake band 150 acts as a drag on the hub 142 to hold overrunning motion of the reel. In the event of breakage of the web W the arm 158 will swing further in this clockwise direction causing the trip screw 172 to depress the switch button 174 of micro switch 176. Micro switch 176 may be connected in any well known manner to the drive power for the machine so that when its switch button 174 is depressed the power of the machine will be turned off. It may be seen, of course, that the web W urges the arm 158 in a counter-clockwise direction during feeding motion.

Figure 4:
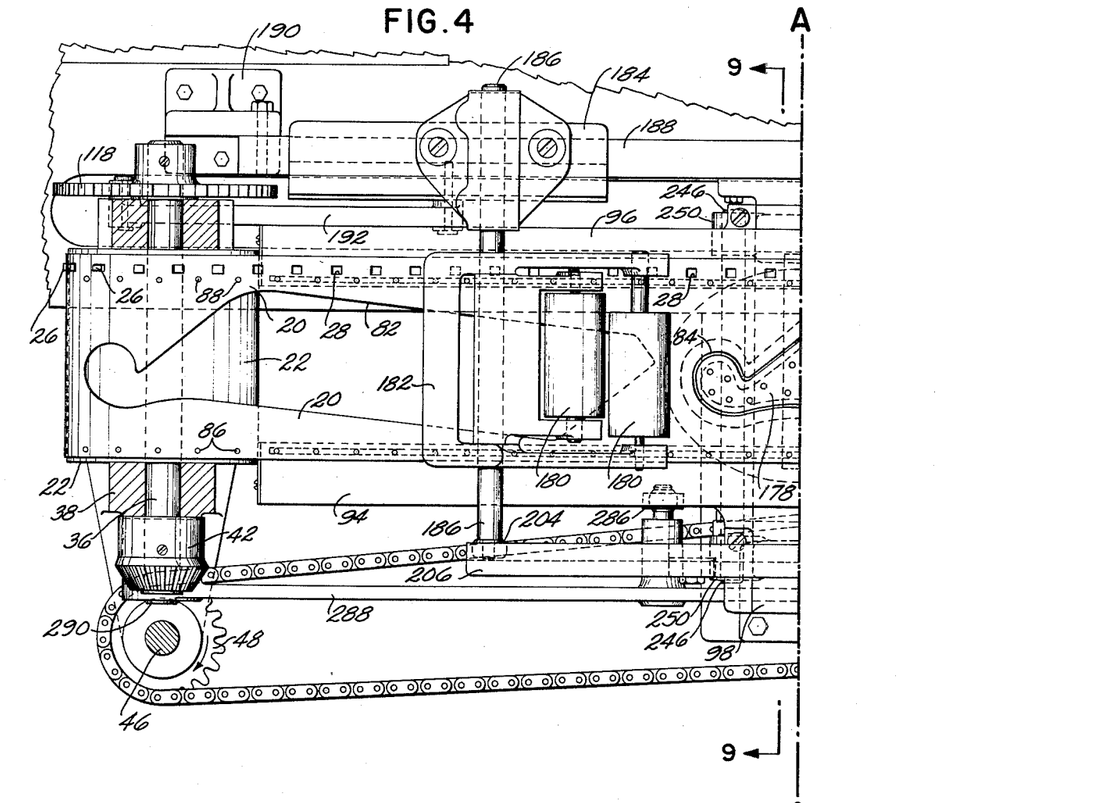
Figs. 4 and 5 when joined at line A—A illustrate a plan view partly in section of the web feeding mechanism in conjunction with a suitable die and cutting roller.
Figure 5:
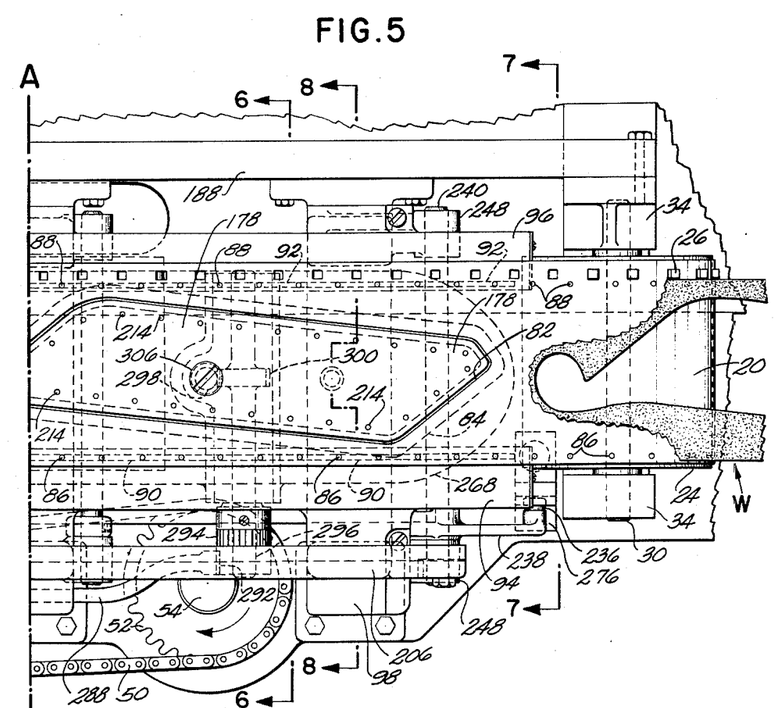

As mentioned heretofore, the web W is intermittently advanced horizontally across the top of the wrapper die 84 (Figs. 4 and 5) which as the web is fed over it is in retracted position and flush with the suction head 178 vertically movable within said die 84. As soon as the cut-out 82 in steel belt 20 carrying the web W across the die registers with said die, said die is moved slightly upward so that the upper cutting edges 85 protrude through said cut-outs and contact the underside of web W. Then a pair of spring-mounted cutting rollers 180 move across this portion of web W and effect a cutting of the wrapper against the raised die edges 85. The cutting rollers then return to their starting position illustrated in Figure 4.

Cutting rollers 180 are spring-mounted in a bracket 182 and are of identical construction and design as the rollers shown and illustrated in U.S. Patent Number 2,405,867, dated August 13, 1946.

The reciprocating motion of cutting rollers 180 is effected by a carriage 184 carrying a horizontal shaft 186 to which is secured the roller carrying bracket 182. The carriage 184 is slidably supported by means of a horizontal bar 188 secured at one end to bracket 190 while the other end is suitably secured to the bracket 34. The lower portion of the carriage is connected by a link 192 to the free end of a cam lever 194 pivotally mounted on a stud shaft 196 (Fig. 2) held by a suitable portion of the frame. Cam lever 194 carries a cam roller 198 engaging a track 200 of a cam 202 secured to the mean cam shaft 80. Additional support is provided for the roller assembly carrying shaft 186 by its guide roller 204 engaging a horizontal track 206 suitably held by and secured to lugs projecting from the suction duct member 98 (Figs. 1, 4, 5 and 9).

After the cutting rollers have returned to their starting position the suction head 178 moves upward with the cut wrapper and meets a wrapper transfer (not shown) for delivery to a conventional wrapping device. The transfer may be of the type shown in U.S. Patent Number 2,235,857, dated March 25, 1941.

Figure 6:
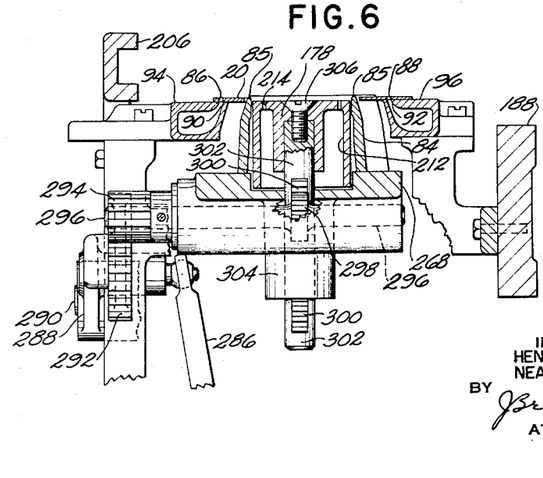
Fig. 6 is a sectional end elevation of the web feed mechanism taken on line 6—6 of Fig. 5.
Figure 8:
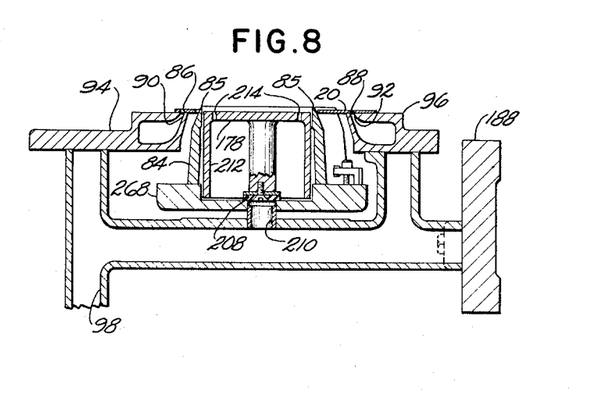
Fig. 8 is another end elevation taken on line 8—8 of Fig. 5.
Figure 9:
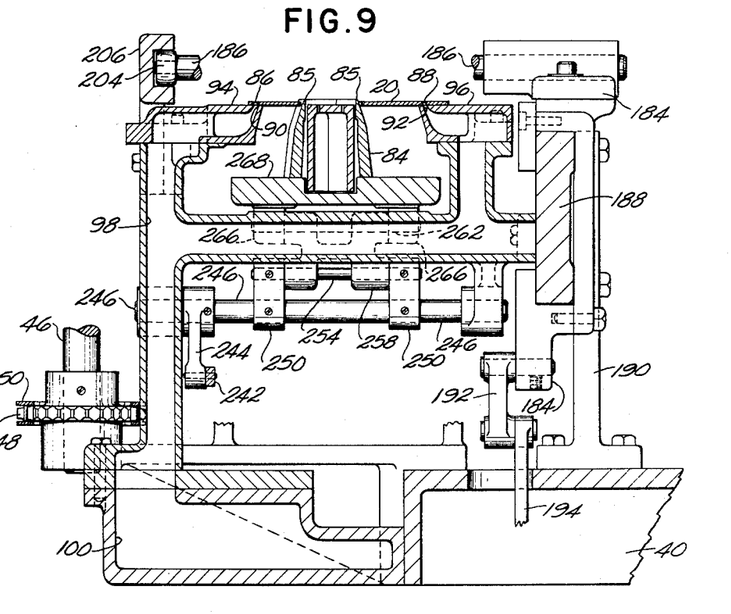
Fig. 9 is a sectional end elevation taken on line 9—9 of Fig. 4.
Figure 10:
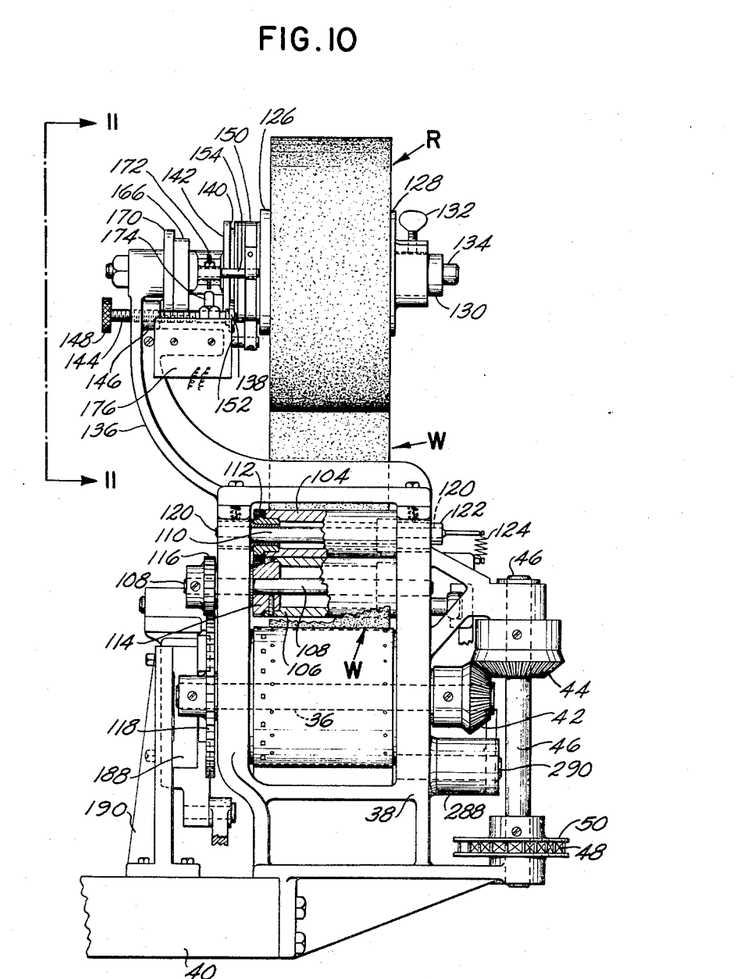
Fig. 10 is an end elevation of the web feeding mechanism taken on line 10—10 of Fig. 1.

While there was no suction applied to the suction head 178 when it was in its lowermost position as shown in Figs. 6 and 8 the upward movement of the latter caused a disengagement of a valve disc 208 from a duct 210 which permits suction to flow from the duct member 98 through duct 210 into a chamber 212 of the suction head 178, the top surface of which is provided with a plurality of holes 214. Thus suction may be applied to the holes 214 from duct 210 when head 178 is raised and then cut off again when it is lowered. Suction, of course, to the duct 98 itself is cut off by valve means as the transfer picks up the cut wrapper. This is well known in the art and further explanation is not deemed necessary. The cutting die 84, of course, also moves downward again to be flush with the top surface of the suction head 178 so that the web carrying steel belt 20 can resume its horizontal motion. The web from which the wrappers are cut remains on the belt until it passes around the pulley for the return run.

Figure 7:
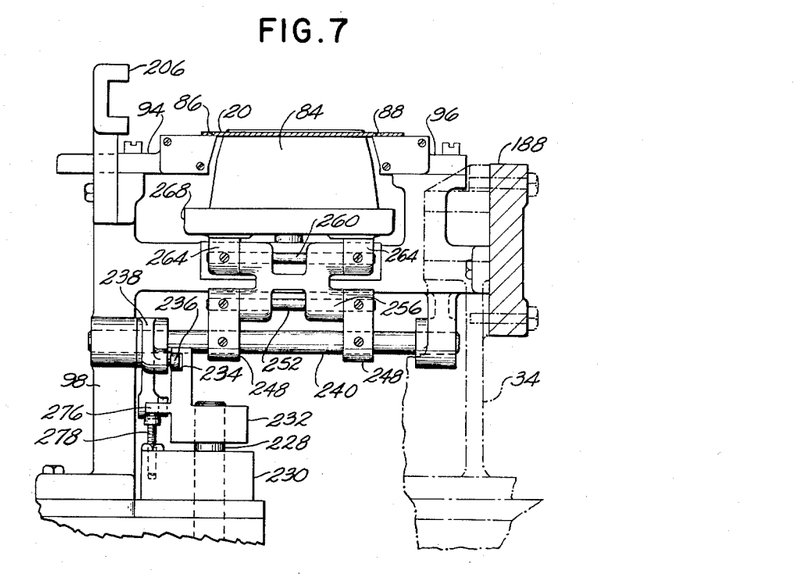
Fig. 7 is an end elevation of the web feeding mechanism illustrating the actuating mechanism for the cutting die taken on line 7—7 of Fig. 5.

The die 84 is actuated by means of a cam segment 216 which is secured to a flange 218 mounted on the main cam shaft 80. The die which is normally in raised position, is lowered during the advance of the web carrying feed belt 20 by means of a cam roller 220 (Figs. 2 and 3) mounted on a cam lever 222 engaging with said cam segment 216. The cam lever 222 is loosely supported by a suitable shaft 224 and its free end through a link 226 is connected to a vertical rod 228 which is slidably supported in bushings of a vertical housing 230 secured to the bed plate 40 of the machine. The upper portion of vertical rod 228 carries a lug 232 (Figs. 1 and 7) which is provided with a horizontal track 234 which engages with a roller 236 carried by a bell crank lever 238 secured to a horizontal shaft 240. Bell crank lever 238 by means of a link 242 is connected to an arm 244 secured to a horizontal shaft 246. Shafts 240 and 246 are rotatably supported in suitable bearing lugs of the duct member 98. To each shaft 240 and 246 are secured a pair of spaced lugs 248 and 250, respectively (Figs. 1, 7 and 9) which on their upper portion carry a horizontal rod 252 and 254, respectively. The rods 252 and 254 pivotally engage with the lower portion of an H-shaped member 256 and 258, respectively. The upper portions of each member 256 and 258 are pivotally connected with a rod 260 and 262, respectively, which are held by suitably spaced lugs 264 and 266, respectively, projecting from the lower side of a platform 268 to the upper surface of which is secured the die 84. Within the housing 230 surrounding the vertical rod 228 is provided compression spring 270 confined between a collar 272 on rod 228 and a shoulder 274 (Fig. 2) within the housing 230. The spring 270 is employed for the purpose of keeping the die in its uppermost and locked position except when rod 8 which causes the lowering of said die is raised as cam roller 220 engaged with the cam segment 216.

In order to check the uppermost position of the die and provide rigid support of the die during cutting action by keeping the toggles formed by the members 248, 256 and 250, 258 in dead center position, lug 232 on vertical rod 228 is provided with a horizontal projection 276 which engages with and is arrested by an adjustable stop screw 278 held by the top portion of housing 230.

The vertical up and down motion of the suction head 178 is provided by the main cam 280 which is integral with cam 78 mounted on the cam shaft 80. Cam 280 engages with a cam roller 282 carried by a cam lever 284 loosely supported at one end by the shaft 224. Cam lever 284 is provided with a suitable tension spring 285 by means of which permanent contact is established between the cam roller 282 and cam 280. Cam lever 284 by means of a link 286 is connected to an arm 288 (Fig. 1) pivotally mounted on a stud 290 held by the bracket 38. The free end of arm 288 is provided with a gear sector 292 (Figs. 1 and 6) which meshes with a gear 294 mounted on a shaft 296 supported in a suitable bearing lug of the platform 268. To shaft 296 is secured another gear 298 which meshes with a gear track 300 of a vertical shaft 302 slidably supported in a bearing hub 304 projecting from the lower portion of platform 268. To the upper end of vertical shaft 302 by means of a screw 306 is secured the suction head 178.

As mentioned heretofore, during operation the web W is fed from the reel R by means of the feed rollers 104, 106 onto the intermittently moving perforated steel belt where the web is held onto the same by means of suction contacting said web at each edge of the web through the holes 86 and 88. The predetermined length of web is fed across the suction head 178 and die 84 until the cut-out 82 in steel belt 20 registers with said die 84 as described hereinabove. During the intermittent motion of the web carried by the steel belt the die 84 is in its lowermost position by virtue of the cam roller 220 engaging with the cam sector 216. As soon as the steel belt and the web come to rest and said cam roller 220 disengages from cam sector 216 the die moves upward to a rigid position by virtue of the toggles 248, 256 and 250, 258, then the cutting rollers roll across the die and a piece of material corresponding to the shape of the die is cut from the web.

After passing over the dies the cutting rollers return to their original position and the suction head with the cut piece of material suctionally held thereto moves upward to be met by a suitable transfer which picks up the cut piece of material and delivers the same, to the enveloping device, such as a wrapping device. The suction in the suction head is controlled by means of a suitable valve arrangement which works in conjunction with the suction in the transfer head so that suction is applied to the transfer device and removed from the suction head at the proper time. This is well known in the art and further description is not thought necessary.

Figure 12:
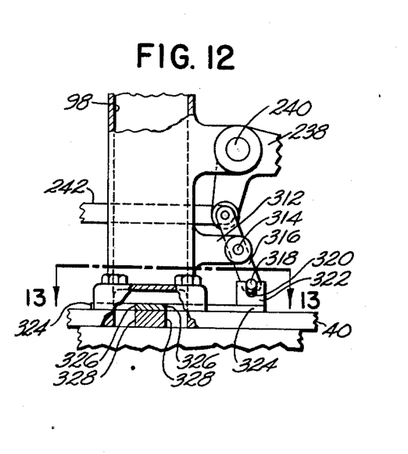
Fig. 12 is an elevation partly in section of a modification for applying suction to the suction head.
Figure 13:
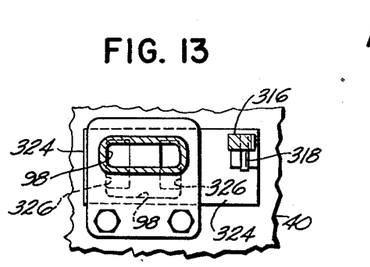
Fig. 13 is a section taken on the line 13—13 of Fig. 12.
Figure 14:
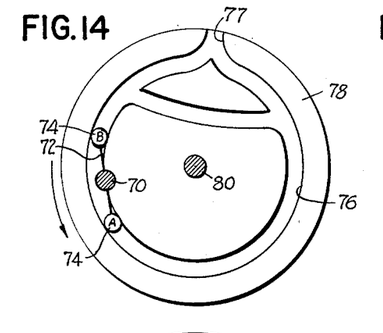
Figs. 14 to 20 diagrammatically illustrate the successive steps of the indexing member 72 actuated by the cam 78 to transform the continuous rotary motion of the latter into intermittent rotary motion which in turn is transmitted through the indexing member 72 to shaft 70.
Figure 15:
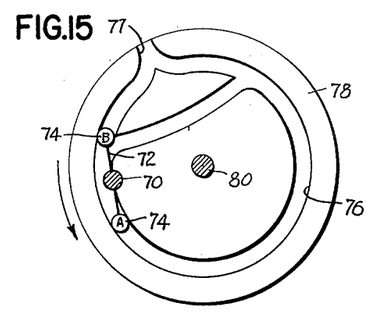
Figure 16:
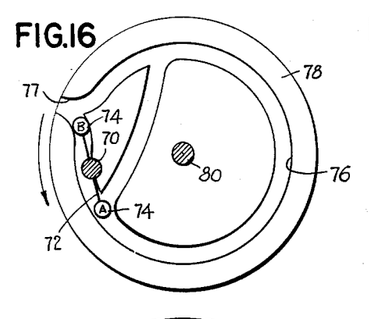
Figure 17:
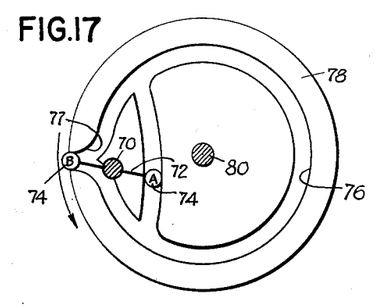
Figure 18:
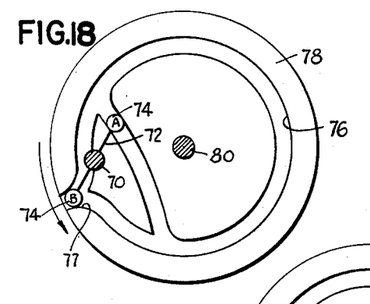
Figure 19:
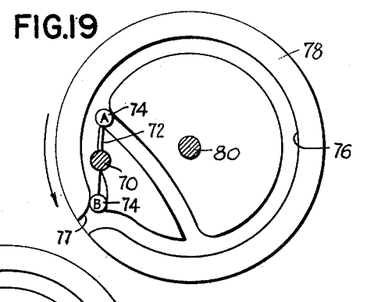
Figure 20:
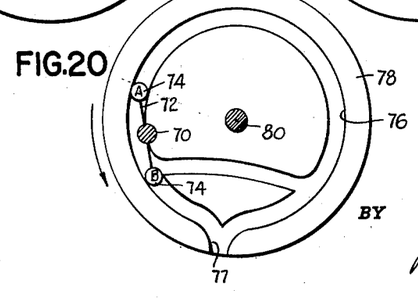

Figs. 12 and 13 show a modified structure for applying suction to the suction head 178. Referring to Fig. 8, when the modified structure is used the valve disc 208 is omitted so that duct 210 is always in communication with the holes 214 of the head 178 regardless of its position.

Referring to Figs. 1, 8, 12 and 13, the modified structure shown in Figs. 12 and 13 has a boss 312 secured on the outside of the suction duct member 98. The boss 312 pivotally supports at 314 a lever 316 which at its upper end is pivotally secured to the bell crank lever 238. The free end of the lever 316 carries a pin 318 engaging a slot 320 in a block 322 secured to a valve slide 324. Valve slide 324 has openings 326 which in the position shown in Fig. 12 register with the openings 328 in the base 40 below duct member 98. When the bell crank lever is rotated counter-clockwise as shown in Fig. 12, the openings 326 of the valve head 324 are moved out of register with the openings 328 to cut off suction.

The bell crank lever 238 through the link 242 and associated mechanism as described heretofore operate the raising of the cutting die 84. Thus, in the modified structure, suction is applied to suction head 178 as soon as cutting die 84 is raised. Thus, the web is held against the suction head 178 during the cutting operation. With some textures of web this is important since the cut wrapper or binder might be moved during the cutting operation. It should be noted that the dimension of the openings 326 in the direction of throw of the slide 324 should correspond to or be less than the amount of throw. By having a plurality of openings 326 staggered to move over spaced openings 328 a maximum amount of communication may be provided with a minimum amount of throw.

We claim:

1. In combination with a cigar machine having a formed die for cutting in a predetermined shape a portion of tobacco for enveloping other tobacco in the formation of a cigar, a continuous belt having its upper run trained across said die, said belt having formed therein openings substantially corresponding to the shape and conformation of said die, drive and indexing means to intermittently advance said belt and to arrest the motion of said belt with said openings in register with said die, said belt having perforations formed adjacent its lateral margins, a suction chamber mounted beneath the upper run of said belt in close contact therewith and in communication with said perforations, a source of suction communicating with such suction chamber, a carriage mounted for reciprocation across the top of said belt and across said die, die cutting means mounted on said carriage, means to reciprocate said carriage during intermittency of the movement of said belt and a source of tobacco web material to supply web to said belt whereby said web may be intermittently advanced across said die and said means may sever portions from said web on said die.

2. On a cigar machine having a die cutter and cooperating means to co-act with said die cutter to perform a cutting operation, a continuous belt intermittently movable across said die, said belt having cut-out perforations formed therein corresponding substantially in shape and size with said die, said belt stopping during its intermittent motion with said perforations in register with said die, said die being movable to a lower position during the advance of said belt and being raised to an upper position through said cut-out perforations during the intermittency of said belt so that a web supported on said belt may be freely advanced across said die and then severed on said die during the intermittency of said belt movement.

3. On a cigar machine having a die cutter and cooperating means to co-act with said die cutter to perform a cutting operation, a continuous belt intermittently movable across said die, said belt having cut-out perforations formed therein corresponding substantially in shape and size with said die, said belt stopping during its intermittent motion with said perforations in register with said die, said die being movable to a lower position during the advance of said belt and being raised to an upper position through said cut-out perforations during the intermittency of said belt so that a web supported on said belt may be freely advanced across said die and then severed on said die during the intermittency of said belt movement and a suction head movable within said die to lift a severed portion from said die after the severing operation, a source of suction and means to connect such source of suction to such suction head during its upward movement.

4. In combination with a die movable from an operative position to an inoperative position of a device for advancing the leading edge of a web across said die, said device comprising a continuous belt, one run of the said belt being trained to move across said die when it is in its inoperative position, said belt having openings therein corresponding substantially in shape and size to said die to permit said die to move through said belt to an operative position when said belt is arrested, said belt further having perforations arranged along and adjacent at least one lateral margin, a suction chamber in communication with said perforations during said run of said belt to suctionally retain a web on said run of said belt so that the web may be gripped and advanced across said die and said die moved to an operative position to sever a shaped portion of said web.

5. In a cigar machine a continuous source of tobacco web, a pair of intermittently driven feed rollers to feed web from said source, a continuous intermittently driven belt for advancing web fed by said feed rollers, a movable cutting die, said die being movable from an operative cutting position to an inoperative position, said belt having a run trained over said die, said belt having at least one opening formed therein corresponding substantially in shape and size to said die, means to move said die through said opening to an operative position during the intermittency of said belt and to withdraw said die to an inoperative position during the movement of said belt, perforations along at least one margin of said belt, a suction chamber operatively mounted beneath said run of said belt to apply suction to said perforations so that a web placed on said run may be suctionally gripped by said belt and advanced thereby, a carriage operatively mounted to reciprocate across said die and said belt during the intermittency of said belt drive and means on said carriage to co-act with said die to sever a shaped portion of web.

6. A device substantially as set forth in claim 5 further characterized by said means for moving said die comprising a toggle constructed and arranged to move to dead center to move said die to its operative position so that it may be rigidly supported during the cutting action.

7. A device substantially as set forth in claim 5 further characterized by a suction head movably mounted in said die and movable from a position beneath the cutting edge of said die to a position above the cutting edge of said die and means associated with such suction head to apply suction thereto when it is moved from its lowermost to its uppermost position to retain the portion of web severed on said die.

8. A device substantially as set forth in claim 5 further characterized by a suction head movably mounted in said die and movable from a position beneath said cutting die to a position above said cutting die and valvular means associated with said suction head and operated by said means to move said die to apply suction to said suction head when said die is moved to its operative cutting position.

9. A device substantially as set forth in claim 7 further characterized in that said means for applying suction to said suction head comprise an opening beneath said suction head, a cover for said opening secured to said suction head and closing said openings when said suction head is in a position beneath the cutting edge of said die, said cover moving upwardly with said suction head to open said opening.

10. A device substantially as set forth in claim 5 further characterized by a suction head positioned in said die and means associated with said suction head to apply suction thereto when said die is in its operative cutting position.

References Cited in the file of this patent

UNITED STATES PATENTS

| Re. 19,677 | Wheeler | Aug. 20, 1935 |
| 668,921 | Liberman | Feb. 26, 1901 |
| 673,252 | Gleim | Apr. 30, 1901 |
| 683,713 | Tyson | Oct. 1, 1901 |
| 1,052,300 | Zeeman et al. | Feb. 4, 1913 |
| 1,505,212 | MacDonald | Aug. 19, 1924 |
| 1,888,788 | Clausen | Nov. 22, 1932 |
| 2,310,556 | Strong | Feb. 9, 1943 |
| 2,405,867 | Wheeler | Aug. 13, 1946 |
| 2,451,920 | Clausen | Oct. 19, 1948 |
| 2,795,275 | Miner | June 11, 1957 |